United States Patent
Huang

(10) Patent No.: US 6,715,898 B1
(45) Date of Patent: Apr. 6, 2004

(54) CARABINER

(75) Inventor: Chin-Lin Huang, Banchiau (TW)

(73) Assignee: Sky Wave Industrial Co. Ltd., Taipei (TW)

( * ) Notice: Subject to any disclaimer, the term of this patent is extended or adjusted under 35 U.S.C. 154(b) by 0 days.

(21) Appl. No.: 10/284,261

(22) Filed: Oct. 31, 2002

(51) Int. Cl.[7] .................................. H04M 1/22

(52) U.S. Cl. .................. 362/191; 362/116; 362/396

(58) Field of Search ......................... 362/191, 190, 362/250, 208, 399, 116, 253, 396

(56) References Cited

U.S. PATENT DOCUMENTS 5,270,909 A * 12/1993 Weiss et al. ................ 362/208

* cited by examiner

Primary Examiner—Alan Cariaso
Assistant Examiner—Guiyoung Lee
(74) Attorney, Agent, or Firm—Troxell Law Office PLLC

(57) ABSTRACT

A carabiner includes a carabiner with a shank which has a housing chamber formed therein to house an elastic element and a battery assembly. A lamp socket is coupled with an opening of the housing chamber and may be turned and moved into the shank in different distances to turn on or off a light bulb so that the carabiner has illuminating function and becomes a portable and handy tool more useful to people.

22 Claims, 7 Drawing Sheets

CARABINER

BACKGROUND OF THE INVENTION

1. Field of the Invention

The invention relates to a carabiner that has a shank with a housing chamber formed therein to house a conductive and elastic element, battery assembly and a lamp socket to provide illumination.

2. Description of the Prior Art

Conventional carabiners such as the one shown in FIG. 1 are widely used in people's life. For instance, they may be used on rock climbing, key chains, etc. They mostly are designed for a single purpose of fastening articles, and are rarely used for other functions.

SUMMARY OF THE INVENTION

To overcome the limitation of single function of the conventional carabiners, the invention aims at providing a carabiner that has a housing chamber located in a shank of the carabiner to house a conductive and. elastic element and a battery assembly in the shank and to couple with a lamp socket so that besides for fastening the carabiner may also provide illumination to become a portable and more useful tool.

The carabiner of the invention has a shank which has a housing chamber formed therein to house an elastic element and a battery assembly. The conductive and elastic element has one end pressing the bottom side of the housing chamber and another end in contact with the negative pole of the battery assembly. There is a lamp socket coupling on the opening of the housing chamber. The lamp socket may be turned and moved into the shank to a first position to turn off the light and to a second position to turn on the light for illuminating.

To achieve the foregoing object, the carabiner of the invention includes a ring, a conductive and elastic element, a battery assembly and a lamp socket. The carabiner has a shank which has a conductive housing chamber. The shank has one end formed an opening and a coupling section. The conductive and elastic element is located at the lowest portion of the housing chamber. The battery assembly is located in the housing chamber above the conductive and elastic element. The lamp socket includes a light bulb which has two legs connecting respectively to a first conductive section and a second conductive section. The lamp socket further has a fastening section engageable with the coupling section of the carabiner so that the first conductive section may press against the battery assembly and the conductive and elastic element. The lamp socket may be moved between the first position and the second position. The second conductive section is spaced from the opening of the housing chamber for a selected distance and in contact therewith.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 4 is a fragmentary sectional view of the carabiner shown in FIG. 2 with the lamp socket at the second position and the light bulb turned on.

DESCRIPTION OF THE PREFERRED EMBODIMENTS

Figure 1:
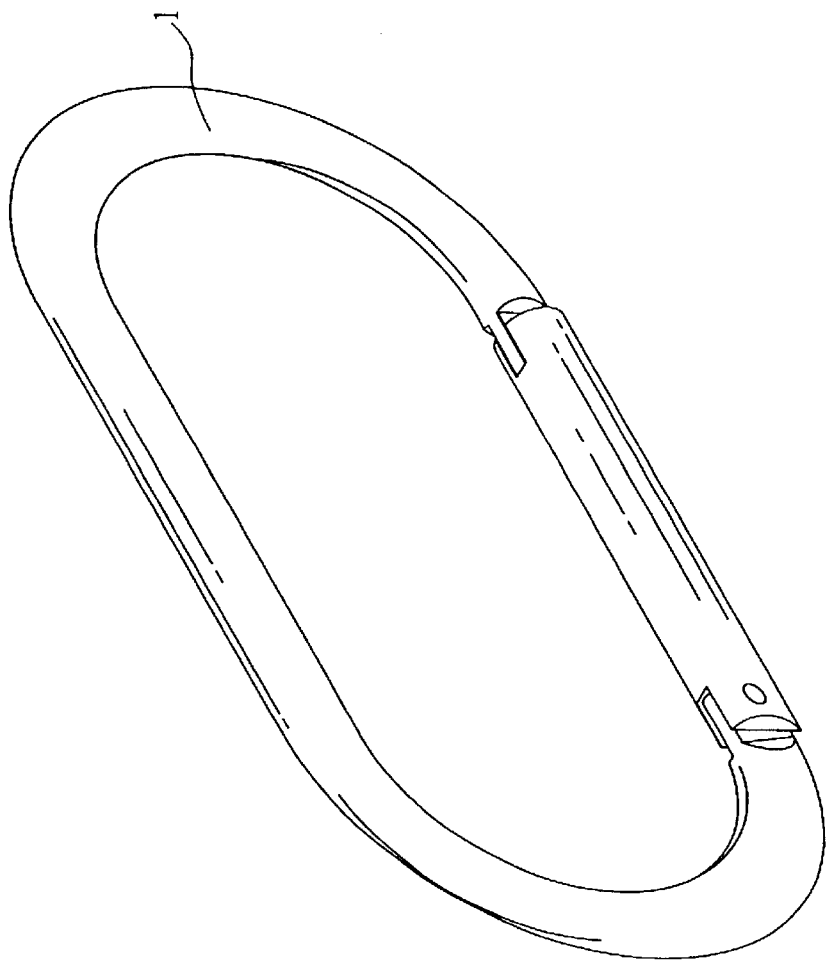
FIG. 1 is a perspective view of a conventional carabiner.
Figure 2:
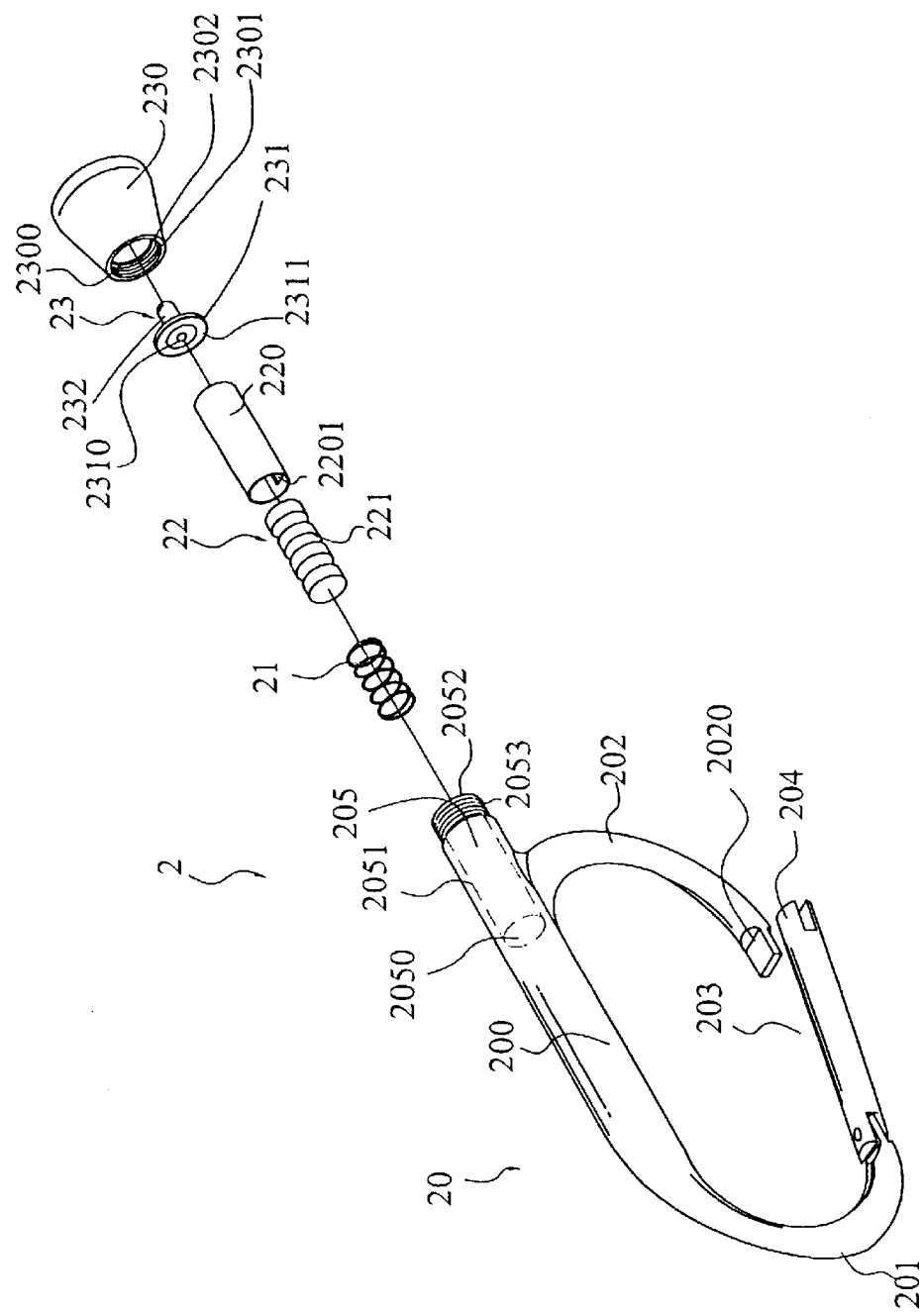
FIG. 2 is an exploded view of a first embodiment of the carabiner of the invention.

Refer to FIG. 2 for a first embodiment of the carabiner of the invention. The carabiner includes a carabiner 20, a metal spring 21 (conductive and elastic element), a battery assembly 22 and a lamp socket 23.

The carabiner 20 is made from a conductive material (such as aluminum, copper and the like) in this embodiment. In includes a shank 200 and two arched rods 201 and 202 extending sideward from two ends of the shank and integrally formed therewith. The two arched rods 201 and 202 are spaced by a gap 203. The arched rod 201 has one end pivotally engaged with a latch member 204 which has another end fastenable to one end 2020 of another arched rod 202 to close the gap 203. Such a construction is known in the art and forms no part of the invention, details are omitted. The shank 200 has one end remote from the arched rod 201 with an indented housing chamber 205 formed therein. The housing chamber 205 has a bottom side 2050 normal to the inner side wall 2051 and an opening 2052. The external peripheral surface of the shank 200 around the opening 2052 forms external screw threads 2053 (coupling section).

The metal spring 21 has a cross section slightly smaller than the opening 2052 of the housing chamber 205 so that it may pass through the opening and be inserted into the housing chamber 205 with one end pressing the bottom side 2050 of the housing chamber 205.

The battery assembly 22 includes an insulation sleeve 220 and at least one battery 221 (four batteries are included in the embodiment). The insulation sleeve 220 has an aperture 2201 to receive the battery 221 into the insulation sleeve 220 in a series manner.

The lamp socket 23 includes a hollow shell 230, a coupling pad 231 and a light bulb 232. The hollow shell 230 is a hollow and conical member with a larger size at one end and a smaller size at another end. It has an inner wall surface 2300 with one end adjacent to the shank 200 and forming internal screw threads 2301 (fastening section) to enable the hollow shell 230 to screw and couple with the external screw threads 2053 of the shank. The hollow shell 230 above the internal screw threads 2301 has an annular groove 2302. The coupling pad 231 is engaged with the annular groove 2302 and has a size larger than the opening 2052 of the housing chamber 205. The coupling pad 231 has one side formed a metal bump 2310 in the center thereof (first conductive section) and a metal ring 2311 (second conductive section). The light bulb 232 is mounted onto another side of the coupling pad 231. The light bulb has two poles (not shown in the drawings) connecting respectively to the metal bump 2310 and the metal ring 2311.

For assembly, first, insert the metal spring 21 into the housing chamber 205 of the shank 200 to make the bottom end of the metal spring 21 in contact with the bottom side 2050 of the housing chamber 205. Next, dispose the battery 221 into the insulation sleeve 220 through the aperture 2201, then place the insulation sleeve 220 through the aperture 2201, then dispose the insulation sleeve into the housing chamber 205 to make the negative pole of the battery 221 located at the bottom end of the insulation sleeve 220 to contact the top end of the metal spring 21. Finally, screw the lamp socket 23 into the shank 200 by coupling the internal screw threads 2301 with the external screw threads 2053 to complete the assembly as shown in FIGS. 3 and 4.

Figure 3:
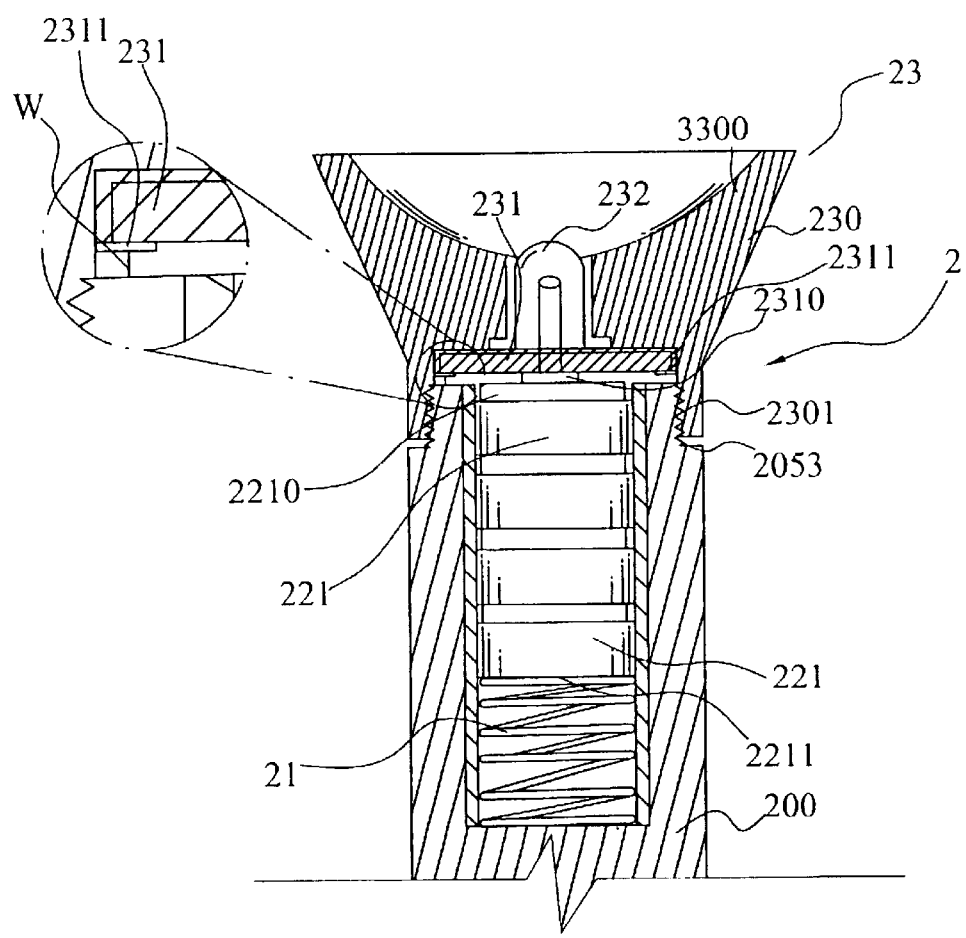
FIG. 3 is a fragmentary sectional view of the carabiner shown in FIG. 2 with the lamp socket at the first position and the light bulb turned off.

FIG. 3 illustrates the lamp socket 23 being coupled with the front end of the external screw threads 2053 of the shank 200, and with the lamp socket 23 located on the first position and the light bulb 23 not generating light. The battery assembly 22 is pushed upwards by the metal spring 21 with the positive pole 2210 of the battery 221 at the top end in contact with the metal bump 2310 of the coupling pad 231. However, the metal ring 2311 of the coupling pad 231 is spaced from the opening 2052 of the shank 200 for a distance W, and the negative pole 2211 of the battery assembly 22 at the lower side is not in contact with the metal ring 2311 of the lamp socket 23. The positive and the negative poles do not connect, thus the light bulb 232 does not generate light.

Figure 4:
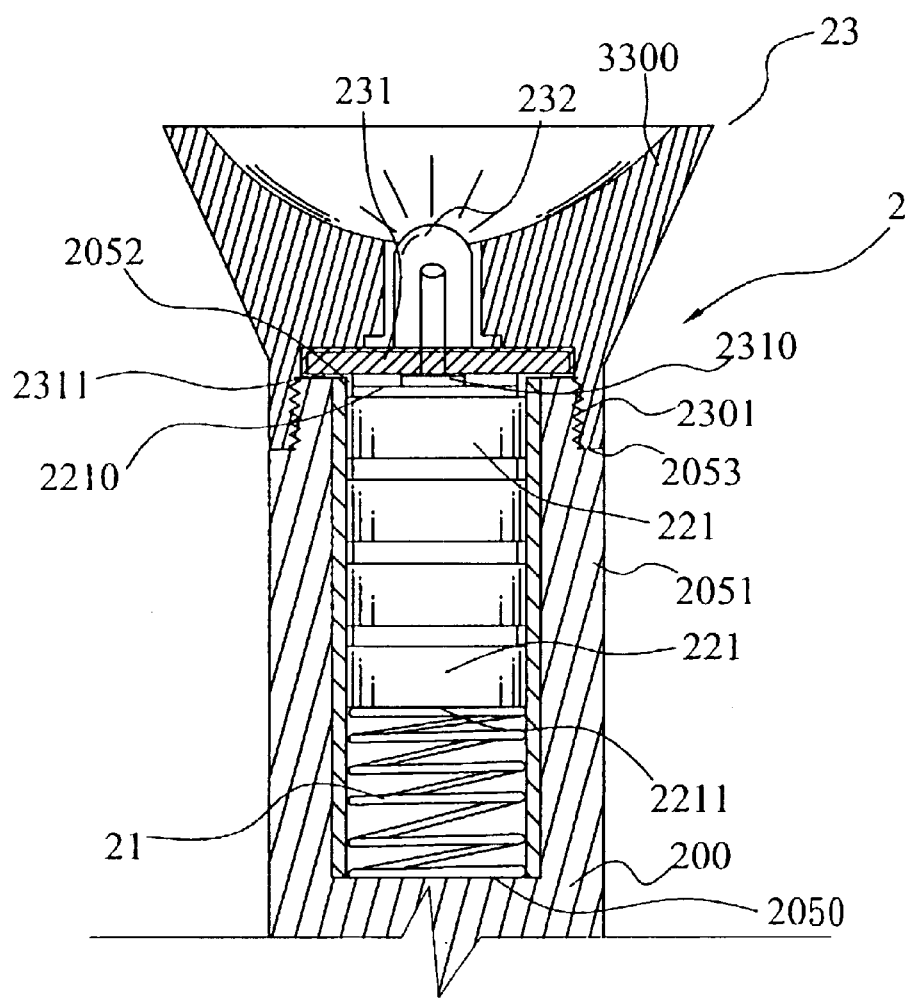

FIG. 4 illustrates the lamp socket 23 being turned and moved downwards to the second position to enable the light bulb 232 to generate light. The metal ring 2311 of the coupling pad 231 of the lamp socket 23 is moved to the top opening 2052 of the inner side wall 2051 of the shank 200, the inner side wall 2051 of the shank 200 contacts the metal spring 21, and through the bottom side 2050 connects to the negative pole 2211 of the battery 221 located at the bottom end of the battery assembly 22 to establish electric connection. The positive pole 2210 is in contact with the metal bump 2310 of the coupling pad 231 through the pushing of the metal spring 21. Therefore the positive and the negative poles are connected and the light bulb 232 generates light.

Figure 5:
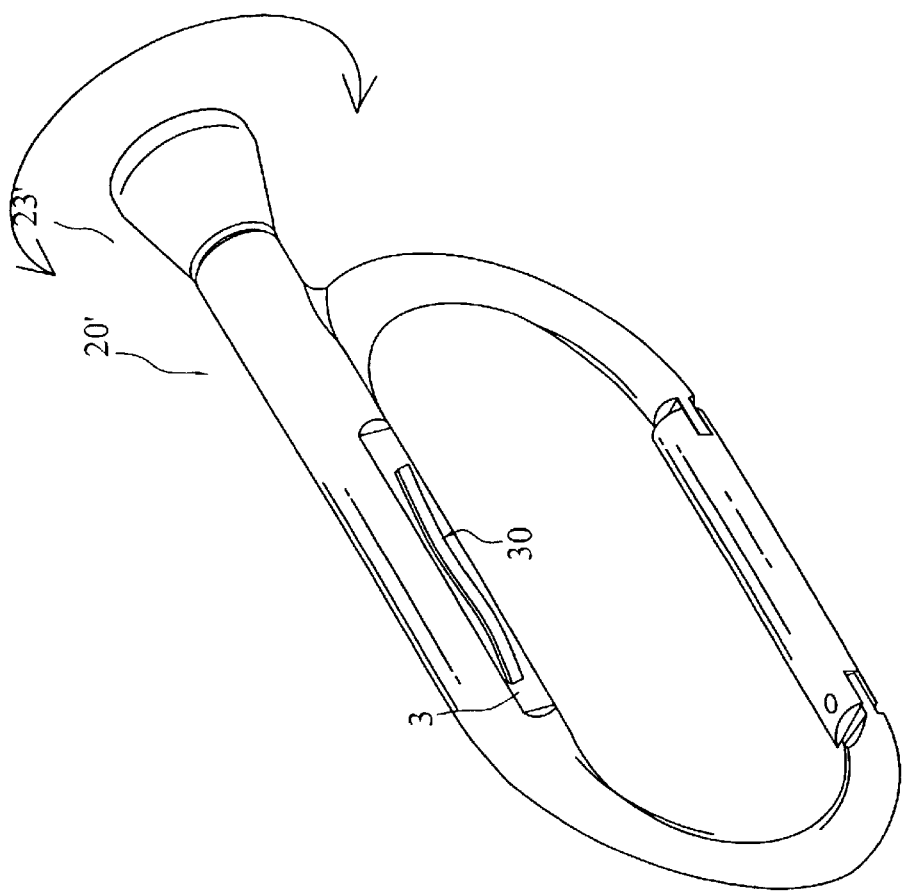
FIG. 5 is a perspective view of a second embodiment of the invention.

Refer to FIG. 5 for a second embodiment of the invention. The construction of the carabiner 20', conductive and elastic element, battery assembly (not shown in the drawing) and lamp socket 23' is substantially same as the first embodiment set forth above, thus details are omitted. The main feature of this embodiment is that the carabiner 20' has a recess plane 3 formed on the outer peripheral surface. The recess plane 3 has a jutting or indented trace texture 30 which may be characters, patterns or the like. Jutting patterns are formed on the trace texture in this embodiment.

Figure 6:
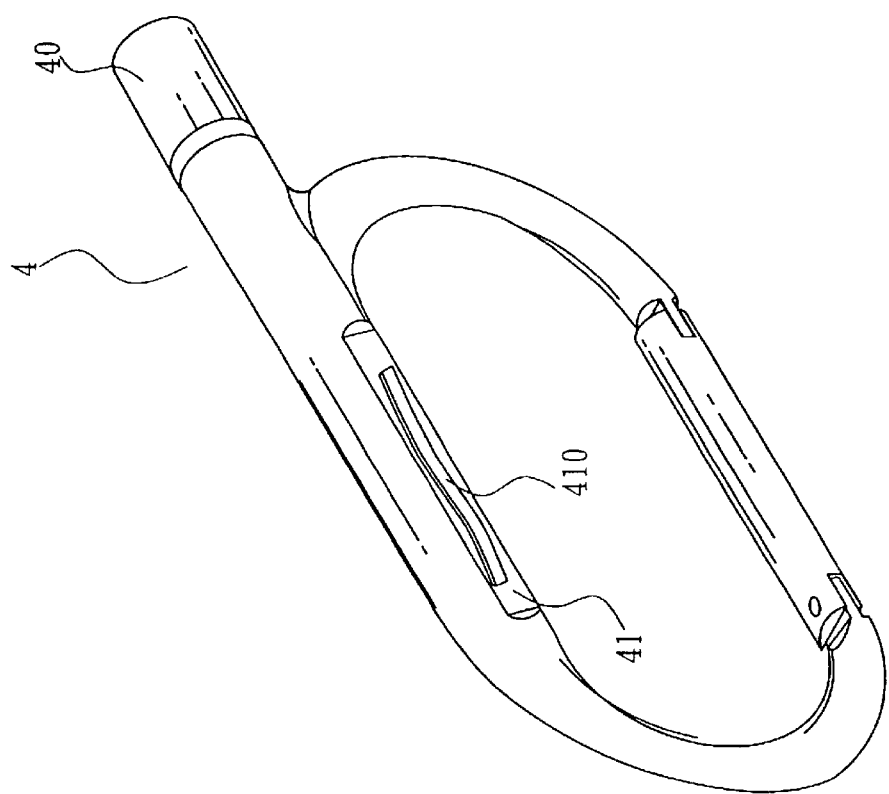
FIG. 6 is a perspective view of a third embodiment of the invention.

Refer to FIG. 6 for a third embodiment of the invention. The construction of the carabiner 4, conductive and elastic element, battery assembly (not shown in the drawing) is substantially same as the previous embodiment set forth above, thus details are omitted. The main feature of this embodiment is that the shell 40 of the lamp socket is formed like a cylinder, and the carabiner 4 has a recess plane 41 formed on the outer peripheral surface. The recess plane 41 has a jutting or indented trace texture 410 which may be characters, patterns or the like. Jutting patterns are formed on the trace texture in this embodiment.

Figure 7:
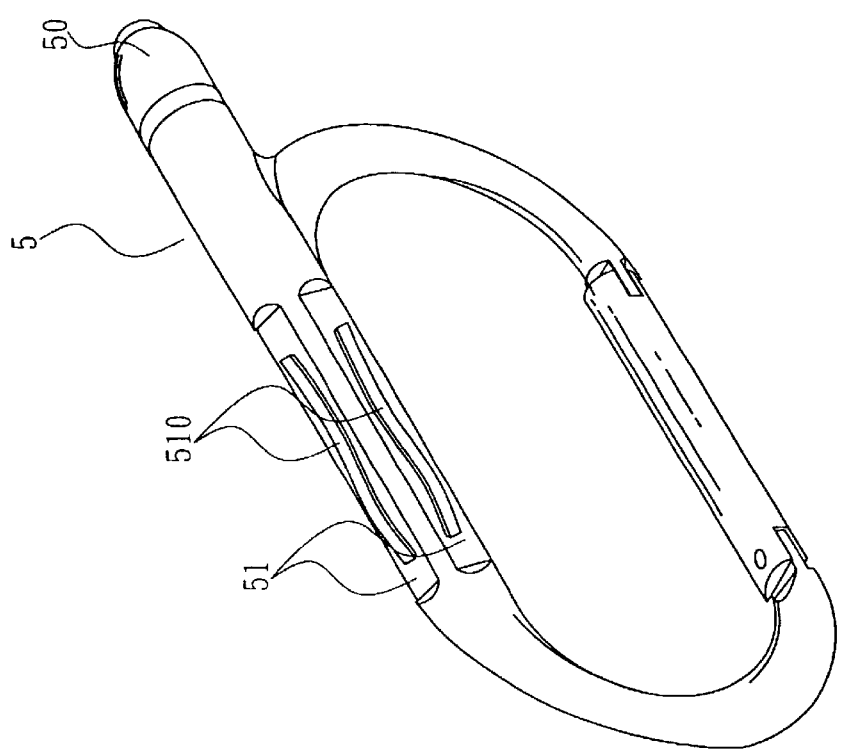
FIG. 7 is a perspective view of a fourth embodiment of the invention.

Refer to FIG. 7 for a fourth embodiment of the invention. The construction of the carabiner 5, conductive and elastic element, battery assembly (not shown in the drawing) is substantially same as the previous embodiment set forth above, thus details are omitted. The main feature of this embodiment is that the shell 50 of the lamp socket is an ellipsoidal shell with a tapered front end, and the carabiner 5 has two recess planes 51 formed on the outer peripheral surface. Each recess plane 51 has a jutting or indented trace texture 510 which may be characters, patterns or the like. Jutting patterns are formed on the trace texture in this embodiment.

Based on previous discussion, it is clear that the carabiner of the invention has a housing chamber formed in the shank to house a conductive and elastic element and a battery assembly, and an opening to couple with a lamp socket to enable the carabiner to have illuminating capability. Thus, besides providing fastening function as the conventional carabiners do, it offers illuminating function and is ready for use wherever users go and whenever needed, such as during climbing rocks at night.

While the preferred embodiments of the invention have been set forth for the purpose of disclosure, modifications of the disclosed embodiments of the invention as well as other embodiment thereof may occur to those skilled in the art. For instance, the trace texture on the shank may be other characters or patterns besides the jutting patterns. Accordingly, the appended claims are intended to cover all embodiments which do not depart from the spirit and scope of the invention.

What is claimed is:

1. A carabiner, comprising:
    a carabiner including a shank which has a conductive housing chamber and a coupling section formed on the peripheral surface adjacent to an opening of the housing chamber;
    a conductive and elastic element located on the bottom of the housing chamber;
    a battery assembly located in the housing chamber above the conductive and elastic element; and
    a lamp socket including a light bulb which has two legs connecting respectively to a first conductive section and a second conductive section, a fastening section engageable with the coupling section such that the first conductive section pressing and connecting to the battery assembly and the conductive and elastic element, and the lamp socket being movable relative to the shank between a first position and a second position to allow the second conductive section to space from the opening of the housing chamber for a selected distance and to form a contact condition.

2. The carabiner of claim 1, wherein the carabiner is made form a conductive material.

3. The carabiner of claim 1, wherein the coupling section has external screw threads and the fastening section has internal screw threads corresponding to the external screw threads.

4. The carabiner of claim 1, wherein the conductive and elastic element is a metal spring.

5. The carabiner of claim 1, wherein the battery assembly includes an insulation sleeve and at least one battery, the insulation sleeve having an aperture to receive the battery in the insulation sleeve in a series fashion.

6. The carabiner of claim 1, wherein the lamp socket includes a hollow shell and a coupling pad, the fastening section being formed on an inner side wall of the hollow shell and having an annular groove formed on an upper section thereof to engage with the coupling pad, the first conductive section and the second conductive section being located on one side of the coupling pad facing the shank, and the lighting bulb being located on another side of the coupling pad.

7. The carabiner of claim 6, wherein the first conductive section is a metal bump located in the center of the coupling pad and the second conductive section is a metal ring located on the periphery of the coupling pad.

8. The carabiner of claim 1, wherein the shank has a recess plane formed on the outer peripheral surface thereof, the recess plane having trace textures.

9. The carabiner of claim 8, wherein the trace textures are characters.

10. The carabiner of claim 6, wherein the hollow shell is conical having one big end and another small end.

11. The carabiner of claim 6, wherein the hollow shell is a hollow cylindrical tube.

12. The carabiner of claim 6, wherein the hollow shell is ellipsoidal having a tapered end.

13. A carabiner, comprising:

a carabiner including a shank and two arched rods extending from the shank, the two arched rods being spaced from each other by a gap, one arched rod having one end pivotally engaged with a latch member for closing the gap, the shank having a housing chamber formed on one end remote from the arched rods, the housing chamber having a conductive bottom side and a conductive inner side wall;

a conductive and elastic element located in the housing chamber having one end in contact with the bottom side of the housing chamber;

a battery assembly located in the housing chamber to contact another end of the conductive and elastic element including at least one battery and an insulation sleeve, the battery being housed in the insulation sleeve in a series fashion; and a lamp socket fastened to an opening of the housing chamber and being movable relative to the shank between a first position and a second position, and having a coupling pad and a light bulb mounted onto the coupling pad, the coupling pad having a first conductive section and a second conductive section connecting to the light bulb, wherein the first conductive section contacts electrically the positive pole of the battery, and the second conductive section connects electrically to the opening of the housing chamber at the second position such that the inner side wall and the conductive and elastic element connect to the negative pole of the battery to light the light bulb on the lamp socket.

14. The carabiner of claim 13, wherein the shank has external screw threads formed on the outside surface thereof adjacent to the opening of the housing chamber, the lamp socket having a hollow shell for housing the coupling pad and the light bulb, the hollow shell having internal screw threads formed on an inner side wall thereof corresponding to the external screw threads for fastening the lamp socket to the shank.

15. The carabiner of claim 13, wherein the conductive and elastic element is a metal spring.

16. The carabiner of claim 13, wherein the first conductive section is a metal bump located in the center of the coupling pad and the second conductive section is a metal ring located on the periphery of the coupling pad.

17. The carabiner of claim 13, wherein the shank has a recess plane formed on the outer peripheral surface thereof, the recess plane having trace textures.

18. The carabiner of claim 17, wherein the trace textures are characters.

19. The carabiner of claim 17, wherein the trace textures are patterns.

20. The carabiner of claim 14, wherein the hollow shell is conical having one big end and another small end.

21. The carabiner of claim 14, wherein the hollow shell is a hollow cylindrical tube.

22. The carabiner of claim 14, wherein the hollow shell is ellipsoidal having a tapered end.

\* \* \* \* \*